United States Patent
Hashizume (10) Patent No.: US 8,812,217 B2
(45) Date of Patent: Aug. 19, 2014

(54) FUEL INJECTION CONTROLLER AND INTERNAL COMBUSTION ENGINE

(75) Inventor: Takeshi Hashizume, Mishima (JP)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 113 days.

(21) Appl. No.: 13/505,372

(22) PCT Filed: Feb. 15, 2011

(86) PCT No.: PCT/IB2011/000279
§ 371 (c)(1),
(2), (4) Date: May 1, 2012

(87) PCT Pub. No.: WO2011/107842
PCT Pub. Date: Sep. 9, 2011

(65) Prior Publication Data
US 2012/0330537 A1    Dec. 27, 2012

(30) Foreign Application Priority Data

Mar. 2, 2010   (JP) .................. 2010-045962

(51) Int. Cl.
*F02B 17/00* (2006.01)
*F02D 41/40* (2006.01)
*F02D 35/02* (2006.01)
*F02D 41/30* (2006.01)
*F02D 41/14* (2006.01)
*F02B 3/00* (2006.01)
*F02D 41/38* (2006.01)

(52) U.S. Cl.
CPC .......... *F02D 35/02* (2013.01); *F02D 2041/389* (2013.01); *F02D 41/403* (2013.01); *F02D 41/3035* (2013.01); *Y02T 10/44* (2013.01); *F02D 41/1467* (2013.01)
USPC ........................................ 701/105; 123/305

(58) Field of Classification Search
USPC .......... 701/105, 102, 110; 123/305, 478, 472, 123/299, 300, 301, 304
See application file for complete search history.

(56) References Cited

U.S. PATENT DOCUMENTS 4,709,672 A * 12/1987 Ishida .......................... 123/256
4,733,641 A *  3/1988 Ishida .......................... 123/276

(Continued)

FOREIGN PATENT DOCUMENTS

DE   10 2005 051 740 A1   6/2006
JP          A-07-004287    1/1995

(Continued)

OTHER PUBLICATIONS

Japanese Office Action issued in Application No. 2010-045962; Dated Feb. 16, 2012 (With Partial Translation).

(Continued)

*Primary Examiner* — Mahmoud Gimie
(74) *Attorney, Agent, or Firm* — Oliff PLC (57) ABSTRACT

An ECU of a fuel injection controller acquires information on a load of an internal combustion engine including a fuel injection valve. Based on the load information, a switch is made between low-load-condition control, in which a main injection is performed at a timing that avoids a spray injected by a pilot injection that drifts due to a swirl effect, and high-load condition control, in which the main injection is performed at a timing that interferes with (at least partially overlaps) a spray injected by the pilot injection that drifts due to a swirl effect. In the low-load-condition control, the spray injected by a pilot injection is diffused before the occurrence of ignition to reduce smoke. In the high-load condition control, the spray injected by the main injection is caused to interfere with the spray injected by the pilot injection that contains OH radicals, to reduce smoke.

12 Claims, 7 Drawing Sheets

(56) References Cited

U.S. PATENT DOCUMENTS

| | | | |
|---|---|---|---|
| 5,740,777 A * | 4/1998 | Yamamoto et al. | 123/305 |
| 6,505,601 B1 | 1/2003 | Jorach et al. | |
| 6,644,269 B2 * | 11/2003 | Kato et al. | 123/305 |
| 2001/0039935 A1 * | 11/2001 | Kato et al. | 123/295 |
| 2006/0042586 A1 | 3/2006 | Hutmacher et al. | |
| 2007/0175440 A1 * | 8/2007 | Lippert et al. | 123/305 |
| 2012/0143479 A1 * | 6/2012 | Nada | 701/104 |

FOREIGN PATENT DOCUMENTS

| | | |
|---|---|---|
| JP | A-11-082139 | 3/1999 |
| JP | A-2008-144673 | 6/2008 |
| JP | A-2009-293595 | 12/2009 |
| JP | A-2010-007558 | 1/2010 |
| WO | WO 2009/087715 A1 | 7/2009 |

OTHER PUBLICATIONS

Written Opinion of the International Searching Authority issued in Application No. PCT/IB2011/000279; Dated Jul. 25, 2011.

International Search Report issued in Application No. PCT/IB2011/000279; Dated Jul. 25, 2011.

* cited by examiner

FUEL INJECTION CONTROLLER AND INTERNAL COMBUSTION ENGINE

The disclosure of Japanese Patent Application No. 2010-045962 filed on Mar. 2, 2010 including the specification, drawings and abstract is incorporated herein by reference in its entirety.

BACKGROUND OF THE INVENTION

1. Field of the Invention

The invention relates to a fuel injection controller and an internal combustion engine.

2. Description of Related Art

It has been proposed to reduce smoke by setting a significantly long ignition retardation period in an operational region, in which combustion temperature is reduced to reduce NOx (see Japanese Patent Application Publication No. 7-4287 (JP-A-7-4287), for example). In addition, in some cases, injection timing is offset so that a fuel spray injected by a main injection does not overlap the fire or the combustion gas of a pilot injection that remains in the combustion chamber. This avoids overlapping the fuel spray injected by the main injection with the fire or the combustion gas of the pilot injection and avoids the fuel spray from being burned under insufficient oxygen conditions. Thus, it is possible to prevent the amount of discharge of smoke from increasing (see Japanese Patent Application Publication No. 11-82139 (JP-A-11-82139)).

SUMMARY

In the ideas described in JP-A-7-4287 and JP-A-11-82139, however, the fuel injection period is long when the load of the internal combustion engine is high. For this reason, even when it is attempted to finish the main injection to avoid a spray of fuel formed by a pilot injection, a spray injected by the main injection partially interferes with a spray of fuel injected by the pilot injection. In addition, during a high load operation, in which the fuel injection period is long, fuel injection continues even after the fuel injected by the main injection is ignited, which causes a certain amount of smoke.

One object is to provide a fuel injection controller and an internal combustion engine that are capable of reducing smoke both in low-load conditions and in high-load conditions.

A fuel injection controller of one embodiment includes a control section that acquires information on a load of an internal combustion engine including a fuel injection valve and switches between a first control and a second control based on the load information. The second control is a control that is selected on the condition that the load of the internal combustion engine is higher than the load for which the first control is selected. The first control is a control in which a main injection is performed at a timing that avoids a spray injected by a pilot injection that drifts due to a swirl effect. The second control is a control in which the main injection is performed at a timing that interferes with a spray injected by the pilot injection that drifts due to a swirl effect.

In the first control, a main injection is performed at a timing such that the spray injected by the main injection does not overlap the spray injected by a pilot injection so that the time for mixing the air and the fuel before ignition is secured thereby facilitating diffusion of the mixture. In this way, the concentration of the mixture is reduced to reduce smoke. Such a first control is intended to reduce smoke by reducing the concentration of the mixture, that is, reduce smoke by physical means.

On the other hand, the second control is intended to reduce smoke by utilizing oxidation of soot and suppression of formation of soot that are effected by OH radicals after ignition. The second control is intended to reduce smoke by causing the OH radicals to react with soot, that is, reduce smoke by chemical means.

When the load of the internal combustion engine is low, the fuel injection period is short and the ratio of the injection period remaining after ignition to the entire main injection period is low. That is, the merit of using the phenomenon that occurs after ignition is small. Thus, in the low-load conditions, the interval between a pilot injection and the subsequent main injection is set to an interval that actively reduces the concentration of the mixture. Specifically, the main injection is performed at a timing that avoids the spray injected by a pilot injection that drifts due to a swirl effect.

On the other hand, when the load of the internal combustion engine is high, the fuel injection period is long, and the ratio of the injection period remaining after ignition to the entire main injection period is high. Thus, in the high-load conditions, the interval between a pilot injection and the subsequent main injection is set to an interval that actively utilizes the phenomenon that occurs after ignition. Specifically, the main injection is performed at a timing that interferes with the spray injected by a pilot injection that drifts due to a swirl effect.

It can be said that causing the OH radicals to react with soot as described above is a measure that is appropriate in view of the tendency in recent diesel engines of decreasing the compression ratio and of increasing the amount of EGR. Specifically, if the compression ratio is further decreased and/or the amount of EGR is further increased, a situation can occur where the amount of oxygen is small even in the region in which there is no spray injected by a pilot injection, and therefore, smoke is easily caused. Thus, in such a situation, it is difficult to reduce the smoke by physical means (for example, by reducing the concentration of the mixture). Thus, it becomes effective to reduce smoke by the chemical means.

The control section in the fuel injection controller may switch to the second control on the condition that an ignition timing of a fuel spray injected by the main injection is within the first half of a main injection period, and switch to the first control on the condition that the ignition timing of the fuel spray injected by the main injection is within the second half of the main injection period.

As described above, the physical means as a measure against smoke exhibits the smoke-reducing effect before ignition and the chemical means exhibits the smoke-reducing effect after ignition. The fuel injection period becomes long when the load of the internal combustion engine is high and the fuel injection amount becomes large. When the load of the internal combustion engine is low, the fuel injection period is short. Thus, when the ignition timing is within the first half of the fuel injection period, the control may be selected that gives weight to the effect of reducing smoke by chemical means that exhibits the effect after ignition. The control section may perform the second control that is performed in the case of such an ignition timing. On the other hand, when the ignition timing is within the second half of the fuel injection period, the control may be selected that gives weight to the effect of reducing smoke by physical means that exhibits the effect before ignition. The control section may perform the first control that is performed in the case of such an ignition timing.

An internal combustion engine of one embodiment may include the above fuel injection controller and the compression ratio of the internal combustion engine may be equal to or below 16. In internal combustion engines of which the compression ratio is equal to or below 16, OH radicals tend to occur. Thus, when the above fuel injection controller is installed in an internal combustion engine of which the compression ratio is equal to or below 16, the effect of reducing smoke by chemical means is further exhibited. In addition, the first control and the second control may be switched when the engine is operated at an EGR ratio of 40% or more. Specifically, the fuel injection controller is effective when installed in an internal combustion engine that is operated in such conditions that promote the formation of OH radicals. Thus, the above fuel injection controller is suitable for the latest internal combustion engine in which the compression ratio is decreased, and the internal combustion engine in which the amount of EGR is increased.

According to the above fuel injection controller, it is possible to reduce smoke both in low-load conditions and in high-load conditions, in which the load of the internal combustion engine is low and high, respectively.

BRIEF DESCRIPTION OF THE DRAWINGS

The foregoing and further objects, features and advantages of the invention will become apparent from the following description of example embodiments with reference to the accompanying drawings, in which like numerals are used to represent like elements and wherein.

DETAILED DESCRIPTION OF EMBODIMENTS

An embodiment of the invention will be described in detail below with reference to drawings.

Figure 1:
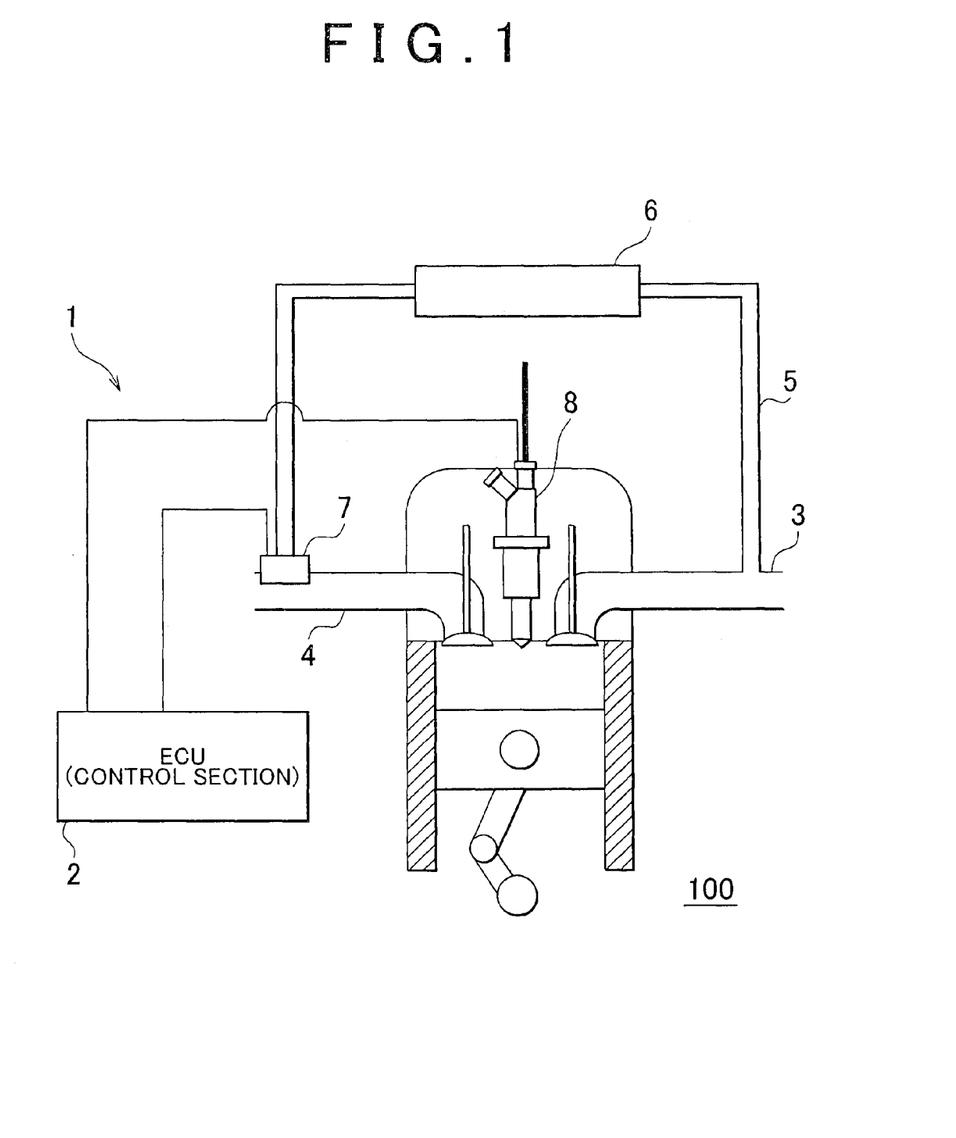
FIG. 1 is a schematic diagram showing an internal combustion engine including a fuel injection controller of an embodiment.

FIG. 1 is a schematic configuration diagram of a diesel engine (hereinafter referred to as the engine) 100 that is an example of an internal combustion engine. The engine 100 includes a fuel injection controller 1. An electronic control unit (ECU) 2 of the engine 100 functions as a control section of the fuel injection controller 1. The ECU 2 is electrically connected to a fuel injection valve 8 provided for the engine 100. The engine 100 includes an exhaust gas recirculation (EGR) pipe 5 that connects between an intake pipe 3 and an exhaust pipe 4. The EGR pipe 5 is provided with an EGR cooler 6. An EGR valve 7 is provided at the connection between the EGR pipe 5 and the exhaust pipe 4. The EGR valve 7 is electrically connected to the ECU 2. A compression ratio of the engine 100 is set at 16 or below. Operation at an EGR ratio of 40% or more is made possible by adjusting the degree of opening of the EGR valve 7. The EGR ratio is a value obtained by dividing the amount of exhaust gas that flows into the cylinder of the engine 100 by the sum of the amount of air taken in through the intake pipe 3 and the amount of exhaust gas that flows into the cylinder of the engine 100 when the exhaust gas flowing in the exhaust pipe 4 is returned to the intake pipe 3 through the EGR pipe 5.

The ECU 2 acquires information on the load of the engine. Specifically, the ECU 2 acquires information on the amount of fuel injection, which has a correlation with the magnitude of the load of the engine. Thus, based on the fuel injection amount information, a switch is made between low-load-condition control (first control) of the fuel injection valve 8 to be performed in the low-load conditions and high-load-condition control (second control) of the fuel injection valve 8 to be performed in the high-load conditions.

Figure 2:
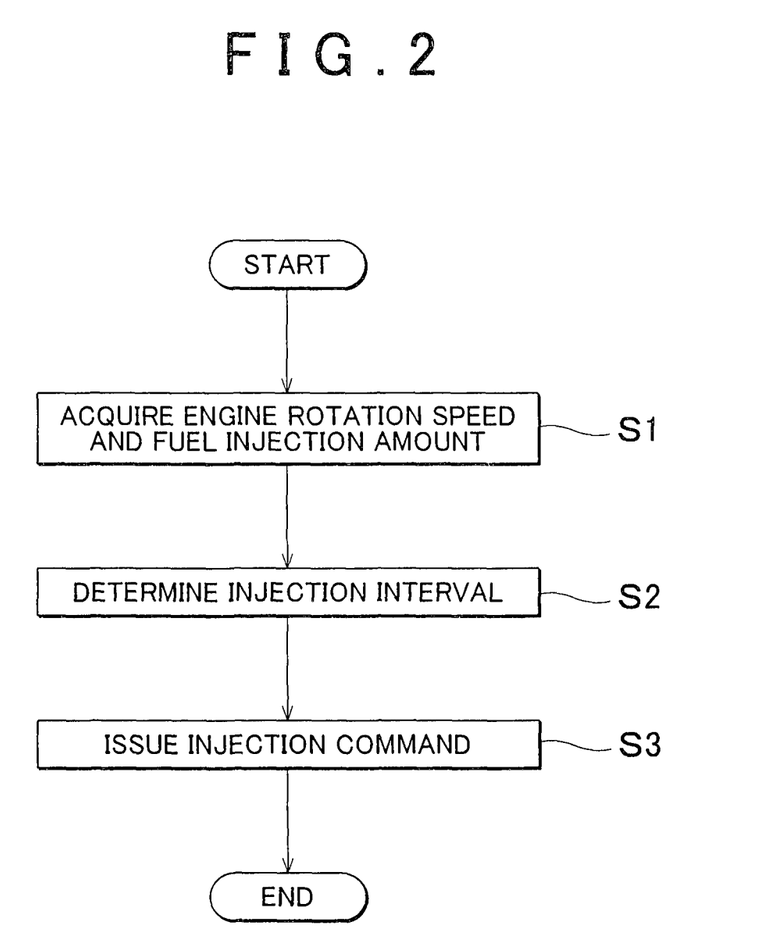
FIG. 2 is a flow chart showing an example of control performed by the fuel injection controller of the embodiment.

An example of fuel injection control performed by such a fuel injection controller 1 will be described with reference to a flow chart shown in FIG. 2.

Figure 3:
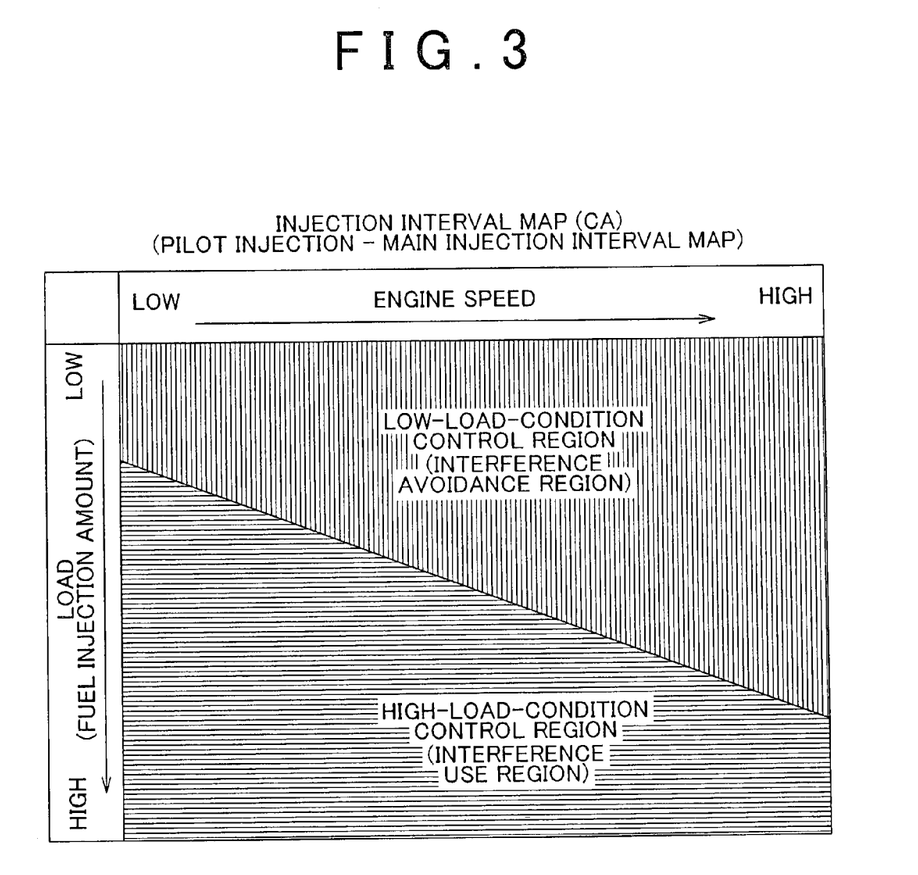
FIG. 3 shows an example of a control map that is used by the fuel injection controller of the embodiment.

The ECU 2 acquires engine rotation speed information and the fuel injection amount information, as operating state of the engine in step S1. Then, in step S2, an injection interval is determined based on these pieces of information. The injection interval is the interval between a pilot injection and the subsequent main injection. The injection interval is determined by referring to an injection interval map, an example of which is shown in FIG. 3.

Figure 4:
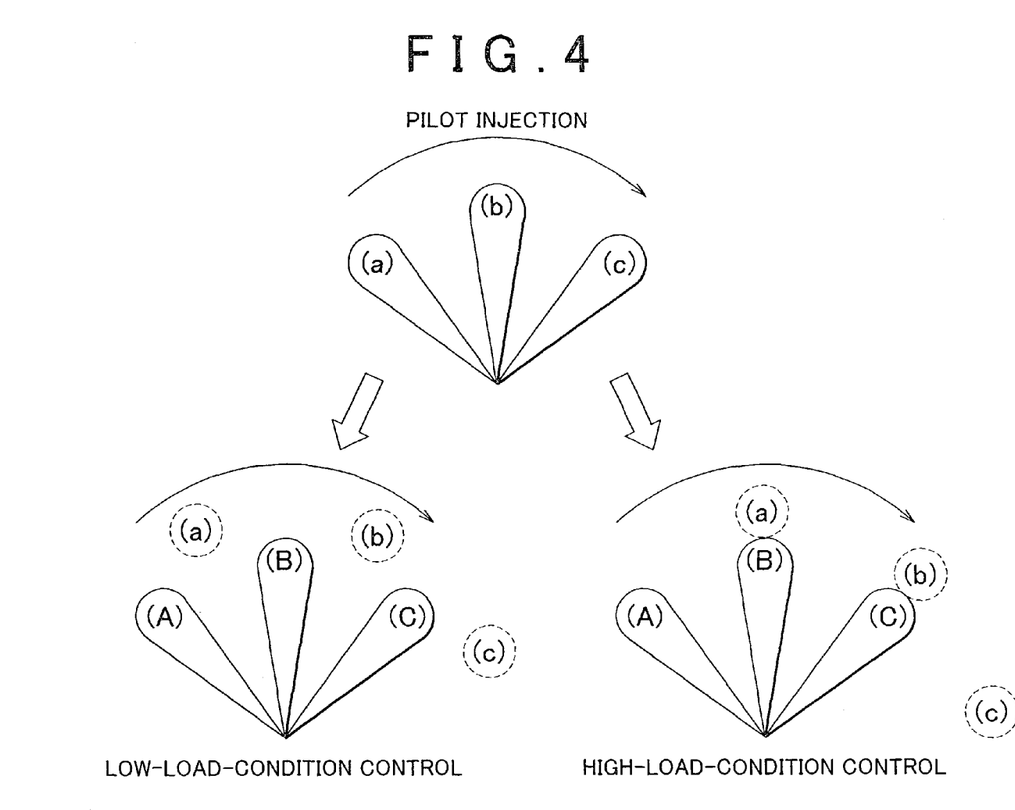
FIG. 4 is an explanatory diagram showing an example of the relation between sprays injected by pilot injections and sprays injected by main injections.

The injection interval map is expressed by crank angles (CA), each of which corresponds to a certain amount of fuel injection at a certain engine speed. The entire map is divided into a low-load-condition control region, in which the low-load-condition control is performed, and a high-load-condition control region, in which the high-load-condition control is performed. The low-load-condition control region is a region where the load is equal to or lower than a predetermined level and the high-load-condition control region is a region where the load is higher than the predetermined level in FIG. 3. The low-load-condition control performs main injections (A) to (C) at timings that avoid the sprays (a) to (c) injected by the pilot injections that are drifted by a swirl effect as shown by the arrow in FIG. 4. On the other hand, the high-load-condition control performs main injections (A) to (C) at timings that interfere with (at least partially overlap) the sprays (a) to (c) injected by the pilot injections that are drifted by a swirl effect as shown by the arrow in FIG. 4. The spray (a) and the main injection (A) mean that these have been injected from the same injection hole. Similarly, each of the pair of the spray (b) and the main injection (B) and the pair of the spray (c) and the main injection (C) means that the pair of injections have been injected from the same injection hole. Thus, for example, in the high-load-condition control shown in FIG. 4, the main injection (B) at least partially interferes with the pilot injection (a). The same is true for main injection (C) and pilot injection (b) in the high-load-condition example of FIG. 4.

When the engine speed is the same, the injection interval is shorter in the low-load-condition control region than that in the high-load-condition control region. Specifically, in the low-load-condition control region, a main injection is performed before the spray injected by a pilot injection reaches the position, at which fuel is injected from the adjacent injection hole, so that the interference between the two injections is avoided. On the other hand, in the high-load-condition control region, the timing of the main injection is retarded as compared to that in the low-load-condition control region, so that a main injection interferes with the spray injected by a pilot injection. As described above, the injection interval map is expressed by crank angles (CA), each of which corresponds to a certain amount of fuel injection at a certain engine speed. Note that the speed of evaporation and diffusion of fuel is constant independent of the engine speed. Thus, the value of CA increases as the engine speed increases.

As described above, in the high-load-condition, it suffices that the injection interval be such that a main injection interferes with the spray injected by a pilot injection that is drifted by a swirl effect and therefore, the timing of the main injection may be further retarded. For example, in FIG. 4, the timing may be set so that the main injection (C) interferes with the spray (a).

A principle adopted in the injection interval map, according to which the shift between the low-load-condition control and the high-load-condition control is made, will now be described. The low-load-condition control is intended to reduce smoke by diffusing, by the time of ignition, the spray injected by a pilot injection. The low-load-condition control is performed to avoid the interference between a main injection and the spray injected by a pilot injection, that is, the low-load-condition control is performed to facilitate a physical effect to reduce smoke. On the other hand, the high-load-condition control is intended to reduce smoke by utilizing oxidation of soot and suppression of formation of soot, such oxidation/suppression being facilitated by OH radicals in the sprays injected by pilot injections. The high-load-condition control is performed to cause the main injection to interfere with the spray injected by a pilot injection, that is, the high-load-condition control is performed to facilitate a chemical effect.

Figure 5:
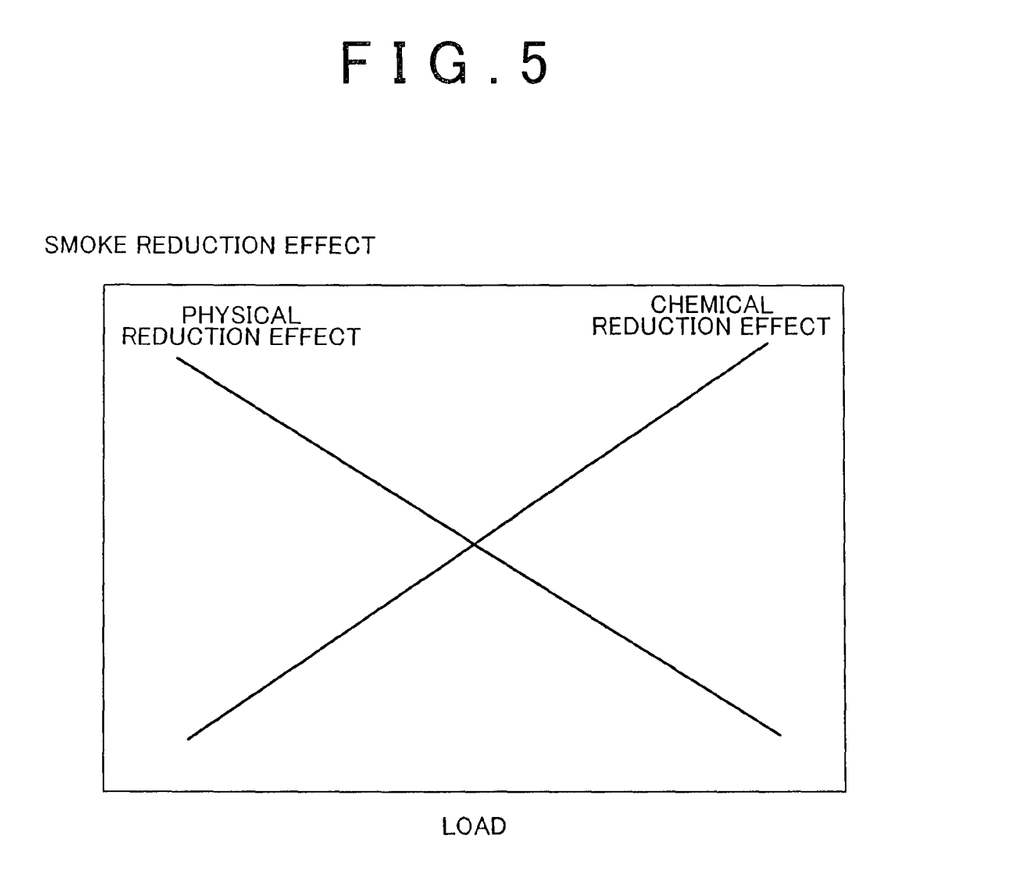
FIG. 5 is an explanatory diagram showing a relation between a physical effect and a chemical effect on reduction of smoke.
Figure 6:
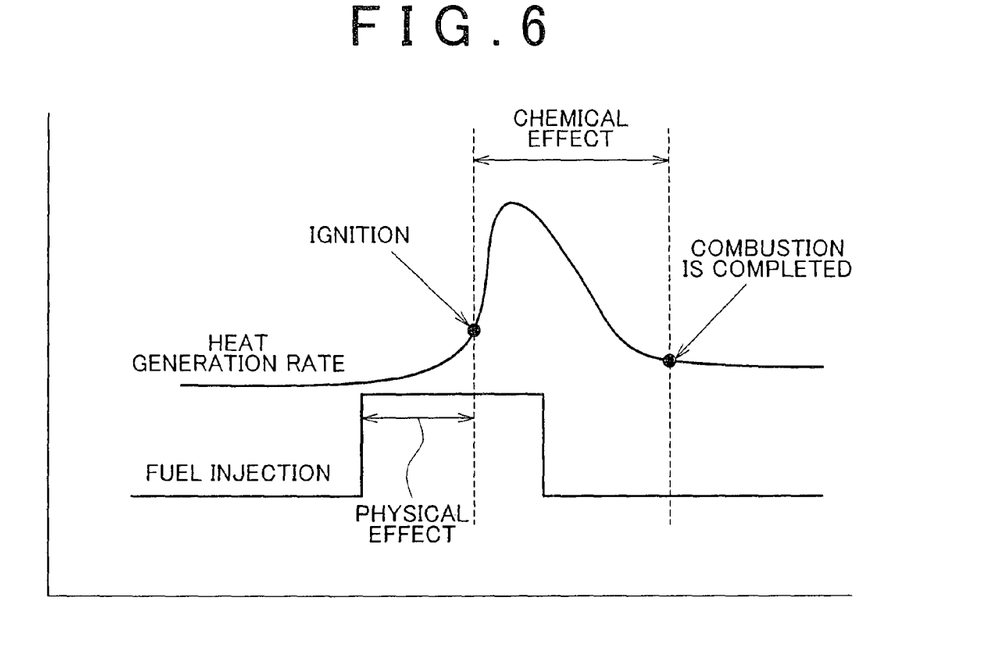
FIG. 6 is an explanatory diagram showing a relation between the fuel injection period and the ignition timing.
Figure 7:
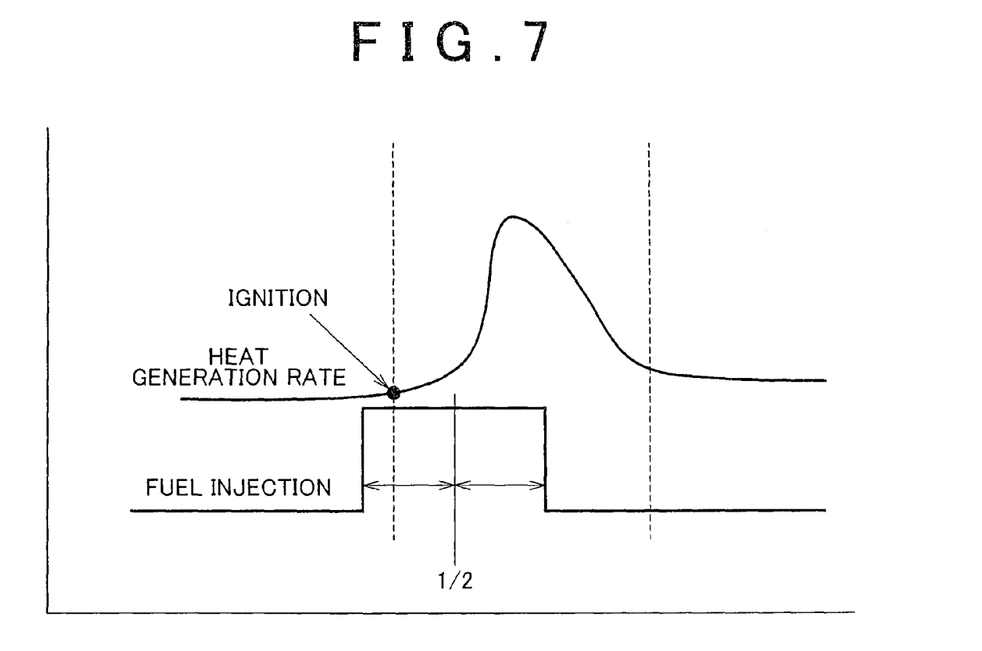
FIG. 7 is an explanatory diagram showing a relation between the fuel injection period and the ignition timing in high-load conditions.
Figure 8:
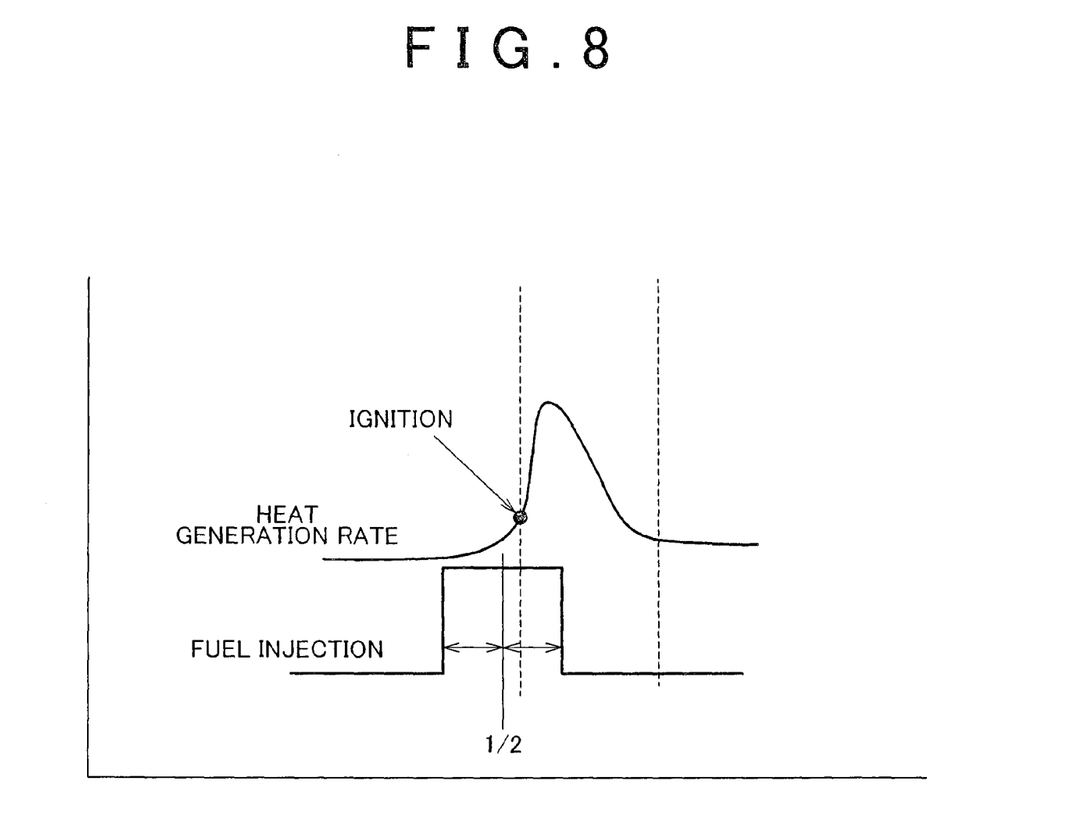
FIG. 8 is an explanatory diagram showing a relation between the fuel injection period and the ignition timing in low-load conditions.

It is considered that reduction of smoke effected by such a physical effect and reduction of smoke effected by such a chemical effect are substantially in inverse proportion as shown in FIG. 5. The physical effect is exhibited during the time from when fuel injection is started to when the spray injected by the main injection is ignited, as shown in FIG. 6. On the other hand, the chemical effect is exhibited during the time from when the spray injected by the main injection is ignited to when combustion is completed, as shown in FIG. 6. Thus, when the ignition timing of the spray injected by the main injection is within the first half of the main injection period, during which the main injection continues, as shown in FIG. 7, the ECU 2 switches to the high-load-condition control. When ignition is performed early in the fuel injection period, the period during which the chemical effect is exhibited is relatively long, and therefore, the main injection and the spray injected by a pilot injection are caused to interfere with each other to reduce smoke. On the other hand, when the ignition timing of the spray injected by the main injection is within the second half of the main injection period as shown in FIG. 8, the ECU 2 switches to the low-load-condition control. When ignition is performed late in the fuel injection period, the period during which the chemical effect is exhibited is relatively short, and therefore, in order to maximize the physical effect, the interference between the main injection and the spray injected by a pilot injection is avoided to reduce smoke.

The fuel injection period is determined generally depending on the fuel injection amount, that is, depending on the load. When the fuel injection period is changed, the relationship between the fuel injection period and the ignition timing is also changed.

The state of interference between the main injection and the spray injected by a pilot injection is determined by the swirl ratio and the interval (injection interval) between a pilot injection and the subsequent main injection. Specifically, when the value obtained by dividing the inter-injection angle (360°/(number of injection holes)) by the swirl ratio at the top dead center (TDC) is equal to the injection interval, the pilot injection and the subsequent main injection interfere with each other. The swirl ratio at the TDC becomes equal to or greater than that of the port swirl due to the decay of swirl and the spin-up effect. The swirl ratio also depends on the actual shape of the combustion chamber. When the injection interval map is prepared, these conditions may be taken into consideration.

The ECU 2 refers to the injection interval map, prepared as described above, to determine the injection interval and then proceeds to step S3. In step S3, the ECU 2 issues an injection command to perform a pilot injection and the subsequent main injection based on the injection interval determined in step S2.

By performing the control as described above, it is possible to reduce smoke both in the low-load conditions and in the high-load conditions, in which the load of the engine 100 is low and high, respectively.

The above-described embodiment is merely an example for carrying out the invention, and the invention is not limited to this embodiment. It is apparent from the above description that various modifications of the embodiment are within the scope of the invention and the invention can be implemented by various other embodiments within the scope of the invention.

What is claimed is:

1. A fuel injection controller comprising:
 a control section that acquires information on a load of an internal combustion engine that includes a fuel injection valve, the control section switching between a first control and a second control based on the information on the load that was acquired, wherein:
 the second control is selected on the condition that the load of the internal combustion engine is higher than the load for which the first control is selected;
 the first control performs a main injection at a timing that avoids a spray injected by a pilot injection that drifts due to a swirl effect;
 the second control performs the main injection at a timing that interferes with the spray injected by the pilot injection that drifts due to the swirl effect; and
 the control section switches to the second control on the condition that an ignition timing of a fuel spray injected by the main injection is within a first half of a main injection period, and switches to the first control on the condition that the ignition timing of the fuel spray injected by the main injection is within a second half of the main injection period.

2. The fuel injection controller according to claim 1, wherein:
 the first control reduces smoke by diffusing a fuel spray injected by the pilot injection before a time of ignition of a fuel spray injected by the main injection, and
 the second control reduces smoke after the fuel spray injected by the main injection is ignited, by utilizing OH radicals in the fuel spray injected by the pilot injection.

3. An internal combustion engine comprising
 the fuel injection controller according to claim 1,
 wherein a compression ratio of the internal combustion engine is equal to or below 16.

4. The internal combustion engine according to claim 3, further comprising:
- an intake pipe;
- an exhaust pipe; and
- an exhaust gas recirculation pipe that returns part of exhaust gas in the exhaust pipe to the intake pipe,
- wherein the internal combustion engine is operable at an EGR ratio of 40% or more, the EGR ratio being a value obtained by dividing an amount of exhaust gas that flows into the internal combustion engine by a sum of an amount of air taken in through the intake pipe and the amount of exhaust gas that flows into the internal combustion engine.

5. A fuel injection controller comprising:
- a control section that acquires information on a load of an internal combustion engine that includes a fuel injection valve, the control section switching between a first control and a second control, wherein:
- the control section (i) switches to the second control on the condition that the load of the internal combustion engine is higher than a predetermined level determined based on an operating state of the internal combustion engine, and (ii) switches to the first control on the condition that the load of the internal combustion engine is equal to or lower than the predetermined level determined based on the operating state of the internal combustion engine;
- the first control performs a main injection at a timing that avoids overlap of a fuel spray from the main injection with a spray injected by a pilot injection that drifts due to a swirl effect;
- the second control performs the main injection at a timing that overlaps at least a part of the fuel spray from the main injection with at least a part of the spray injected by the pilot injection that drifts due to the swirl effect; and
- the control section switches to the second control on the condition that an ignition timing of the fuel spray injected by the main injection is within a first half of a main injection period, and switches to the first control on the condition that the ignition timing of the fuel spray injected by the main injection is within a second half of the main injection period.

6. The fuel injection controller according to claim 5, wherein:
- the first control reduces smoke by diffusing a fuel spray injected by the pilot injection before a time of ignition of the fuel spray injected by the main injection, and
- the second control reduces smoke after the fuel spray injected by the main injection is ignited, by utilizing OH radicals in the fuel spray injected by the pilot injection.

7. An internal combustion engine comprising
the fuel injection controller according to claim 5,
wherein a compression ratio of the internal combustion engine is equal to or below 16.

8. The internal combustion engine according to claim 7, further comprising:
- an intake pipe;
- an exhaust pipe; and
- an exhaust gas recirculation pipe that returns part of exhaust gas in the exhaust pipe to the intake pipe,
- wherein the internal combustion engine is operable at an EGR ratio of 40% or more, the EGR ratio being a value obtained by dividing an amount of exhaust gas that flows into the internal combustion engine by a sum of an amount of air taken in through the intake pipe and the amount of exhaust gas that flows into the internal combustion engine.

9. The fuel injection controller according to claim 5, wherein the operating state includes an engine speed of the internal combustion engine.

10. A method of performing fuel injection in an internal combustion engine that includes a fuel injection valve, the method comprising:
- acquiring information on a load of the internal combustion engine;
- switching to a second control on the condition that the load of the internal combustion engine is higher than a predetermined level that is based on an operating state of the internal combustion engine; and
- switching to a first control on the condition that the load of the internal combustion engine is equal to or lower than the predetermined level that is based on the operating state of the internal combustion engine, wherein
- the first control performs a main injection at a timing that avoids overlap of a fuel spray from the main injection with a spray injected by a pilot injection that drifts due to a swirl effect,
- the second control performs the main injection at a timing that overlaps at least a part of the fuel spray from the main injection with at least a part of the spray injected by the pilot injection that drifts due to the swirl effect,
- the method switches to the second control on the condition that an ignition timing of the fuel spray injected by the main injection is within a first half of a main injection period, and
- the method switches to the first control on the condition that the ignition timing of the fuel spray injected by the main injection is within a second half of the main injection period.

11. The method according to claim 10, wherein:
- the first control reduces smoke by diffusing a fuel spray injected by the pilot injection before a time of ignition of the fuel spray injected by the main injection, and
- the second control reduces smoke after the fuel spray injected by the main injection is ignited, by utilizing OH radicals in the fuel spray injected by the pilot injection.

12. The method according to claim 10, wherein the operating state includes an engine speed of the internal combustion engine.

* * * * *